United States Patent [19]

Kelm et al.

[11] 4,274,372
[45] Jun. 23, 1981

[54] LIGHTWEIGHT PISTON FOR INTERNAL COMBUSTION ENGINES

[75] Inventors: Walter Kelm, Neuenstadt-Stein; Ulrich Landau, Oedheim, both of Fed. Rep. of Germany

[73] Assignee: Karl Schmidt GmbH, Neckarsulm, Fed. Rep. of Germany

[21] Appl. No.: 77,213

[22] Filed: Sep. 20, 1979

[30] Foreign Application Priority Data

Sep. 27, 1978 [DE] Fed. Rep. of Germany ....... 2841980

[51] Int. Cl.³ .............................. F16J 1/14; F16J 1/04
[52] U.S. Cl. .................................. 123/193 P; 92/187; 92/239
[58] Field of Search ............... 123/193 P; 92/187, 239

[56] References Cited

U.S. PATENT DOCUMENTS

| | | | |
|---|---|---|---|
| 1,741,243 | 12/1929 | Long | 92/239 |
| 1,756,761 | 4/1930 | Reid | 92/239 X |
| 1,921,643 | 8/1933 | Teetor | 92/239 |
| 1,936,601 | 11/1933 | Jardine | 92/239 |
| 2,026,789 | 1/1936 | Long | 92/239 |
| 2,177,574 | 10/1939 | Malina | 92/239 X |
| 2,874,009 | 2/1959 | Peterson et al. | 92/239 X |

FOREIGN PATENT DOCUMENTS

| | | | |
|---|---|---|---|
| 2430829 | 1/1976 | Fed. Rep. of Germany | 123/193 P |
| 2441955 | 3/1976 | Fed. Rep. of Germany | 123/193 P |
| 2,717,943 | 10/1978 | Fed. Rep. of Germany | 123/193 P |
| 586259 | 12/1924 | France | 92/239 |
| 429988 | 6/1935 | United Kingdom | 92/239 |
| 877673 | 9/1961 | United Kingdom | 92/239 |

*Primary Examiner*—Wendell E. Burns
*Attorney, Agent, or Firm*—Sprung, Felfe, Horn, Lynch & Kramer

[57] ABSTRACT

In a cast light-alloy piston having a skirt which is recessed adjacent to the piston pin bosses, the two sides of the skirt are unsymmetrical with respect to the piston pin bosses.

For an improved adaptation to the different conditions of operation of the engine, the skirt is connected to the piston pin bosses on one side by supporting ribs which extend at an angle of 30 to 60 degrees to the piston pin axis, and on the other side by supporting ribs extending at an angle of 90° to the piston pin axis.

7 Claims, 6 Drawing Figures

LIGHTWEIGHT PISTON FOR INTERNAL COMBUSTION ENGINES

BACKGROUND OF THE INVENTION

1. Field of the Invention

This invention relates to a cast light-alloy piston, preferably for high-duty internal combustion engines, which piston comprises a skirt that is recessed adjacent to the piston pin bosses and is non-symmetrical on both sides of the piston pin plane.

2. Discussion of Prior Art

A light-alloy piston which serves to transform thermal energy into mechanical energy in an internal combustion engine is subjected to very high stresses by continually changing, high pressures, high temperatures and friction. Such piston is expected to meet a large number of requirements regarding oil consumption, seizure-proofness, groove wear and silent operation under all operating conditions. It has been an object of considerable development work to provide a light-alloy piston, which differs greatly from cylinder of gray cast iron in coefficient of expansion, is constrained to move exactly along a straigt line so that a uniform motion is ensured.

These requirements are met best by an expansion-controlled piston, in which an undesired increase in diameter due to thermal expansion is prevented by the provision of expansion-inhibiting steel inserts. In such piston, it is attempted to divert the expansion of the piston preferably toward the direction of the piston pin axis and to match the piston clearance in the pressure and backpressure directions to the cylinder diameter as far as possible under all operating conditions.

Under the thermal load and the screw forces exerted, the cylinder is deformed so as to form a gas pressure-tight joint with the cylinder head. The piston must follow these out-of-circular shapes and deformations and must be adaptable by elasticity and provide a clearance. The cooperation of the piston clearance, expansion control and deformation of the skirt is decisive for a straight motion of the piston in the cylinder. All piston designs are the result of a compromise between the requirements for adequate stiffness, stress concentration factor and expansion control function becuase the piston clearance will differ during the operation of the internal combustion engine under partial and full load.

The wall thickness and the support of the piston skirt on the piston pin bosses influence the stiffness of the piston, i.e., the resistance of the skirt of the piston to deformation by an exerted force. During the change of engagement, the light-alloy piston will be canted to assume in the cylinder a canted position so that the top edge of the piston skirt engages one side of the cylinder and the bottom of the skirt engages the opposite side of the cylinder. The displacement of the points on which forces are exerted changes also the stiffness conditions at the skirt and results in lower and higher values. A high stiffness results generally in a smaller inclination of the piston in the cylinder and prevents a disengagement of other portions of the skirt.

The motion of the piston is also influenced by the shape of the outside peripheral surface of the skirt in longitudinal section and by its ovality. The outside peripheral surface of the skirt may have such a shape in longitudinal section that pressure marks will be avoided and that the piston will be in rolling contact as it is tilted at the dead centers and that the floating of the piston on the lubricating oil film will be improved. The ovality of the piston skirt influences the deformation of the skirt, the skirt tension, the action of friction and the hydrodynamic lubrication. A known design is the slotted-skirt piston, in which load-carrying portions of the skirt are separated from the hot piston head by slots so that the load-carrying portions of the skirt exhibit a smaller expansion. Transverse slots result in a certain expansion control action and longitudinal slots in a high elasticity of the skirt.

These slotted-skirt pistons have a very low stability because after a prolonged period of operation they exhibit permanent deformations, which result in stronger noise or in incipient cracking of the piston skirt. Whereas numerous improvements of the slot configurations have been proposed, these pistons do not fulfil the requirements to be met by pistons for internal combustion engines. The elastic skirt of the slotted-skirt piston performs a spring action not only to compensate thermal expansion but also owing to the lateral forces which are due to the working pressure increasas also the running clearance when the internal combustion engine is operating under load. For this reason such pistons have not been successful in high-duty internal combustion engines.

It is an object of the invention to improve the compromise of the requirements to be met by a light-alloy piston regarding adequate stiffness, stress concentration factor and expansion control action and to provide a piston which is adaptable to different conditions of engine operation under all operating conditions.

In accordance with the invention, this object is provided by a light-alloy piston of the kind described first hereinbefore wherein in accordance with the invention, one side of the skirt is joined to the piston pin bosses by supporting ribs extending at an angle of 30 to 60 degrees, preferably 45°, to the piston pin axis, and the other side of the skirt is connected to the piston pin bosses by supporting ribs extending at an angle of 90° to the piston pin axis.

At the open end of the skirt, the skirt portions are suitably joined to form a circular, closed skirt.

As a result, the piston is designed as a so-called window piston having a wide skirt portion on one side of the skirt, preferably on the pressure side, and as a box-shaped piston on the other side of the skirt, preferably on the back-pressure side.

The spacing of the supporting ribs which extend at an angle of 90° to the piston pin axis is 65 to 75% of the piston diameter.

The nature and arrangement of the expansion control means depend highly on the thermal and mechanical loads applied to the expansion-controlled piston within the internal combustion engine. For this reason there can be provided an expansion control action by a closed sheet steel ring embedded in the upper portion of the skirt casting between the piston pin bosses and the lowermost ring groove.

In such an expansion control system the control in the lowermost ring groove at least on one side of the skirt is 80 to 90 degrees of the periphery of the piston.

If the outside peripheral surface of the skirt of a piston has in longitudinal section a shape which matches that design, the piston may exhibit a uniform clearance, a good carrying pattern, a smaller deformation of the skirt and an improved motion.

In accordance with a preferred further feature of the invention, the piston is provided with one or more segment-shaped expansion control members of steel, which are embedded in the skirt casting adjacent to the top edge of the skirt at the inside peripheral surface of the load-carrying skirt portions. The expansion control members of steel are locked in the piston bosses. A good support of the skirt portion is ensured by the provision of an integrally cast, inner annular bead, which extends from the inside surface of the piston head as an extension of the piston head and between the piston bosses. The expansion control function can be strongly influenced by a machining of the lowermost ring groove so as to expose the top edges of the cast-in expansion control members of steel.

In principle, the light-alloy piston may be designed on the pressure side as a box-shaped piston and on the backpressure side as a window piston with or without an expansion control member and transverse slot if this is permitted by the thermal increase in diameter and by the piston clearance.

In dependence on the design of the internal combustion engine, the features according to the invention result in a desirable motion of the piston even after a prolonged operating time of the engine because a tilting caused by transverse forces is prevented by a high stability of the skirt and a uniform pressure per unit of area on one engaging side and a good expansion control function and a uniform theoretical overlap on the opposite engaging surface. Because a rigid piston portion and an expansion-controlled piston portion which is elastic owing to the presence of a transverse slot are combined, the piston moves in the cylinder along a straight line, as is decisive for decreased running noise.

BRIEF DISCRIPTION OF DRAWING

A light-alloy piston designed according to the invention is shown in the drawings in which:

FIG. 1 is a view showing a piston, partly in longitudinal section, in the plane of the piston pins and the plane of the pressure-backpressure direction, FIG. 2 is a transverse sectional view taken on line I—I of FIG. 1, FIG. 3 is a longitudinal sectional view on the plane of the pressure-backpressure direction of the piston of FIG. 1, FIG. 4 is a view showing another piston, partly in longitudinal section, in the plane of the piston pins and the plane of the pressure-backpressure direction, FIG. 5 a transverse sectional view taken on line II—II in FIG. 4 and FIG. 6 a longitudinal sectional view on the plane of the pressure-backpressure direction in the piston of FIG. 4.

DESCRIPTION OF SPECIFIC EMBODIMENT

Figure 1:
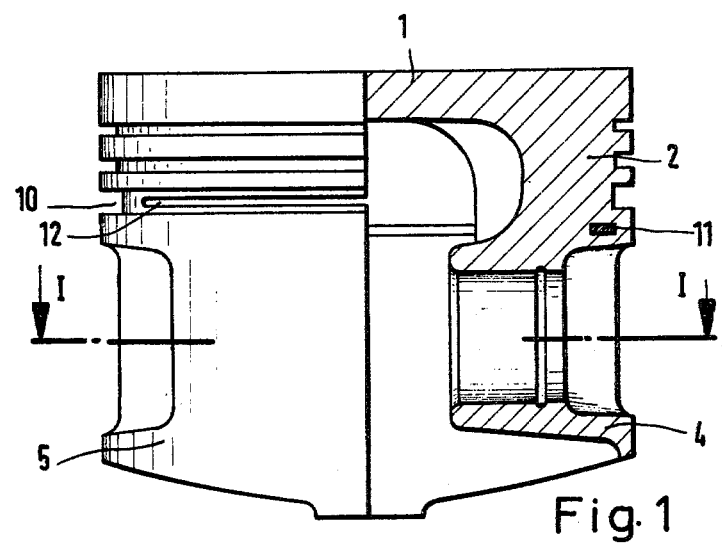
Figure 2:
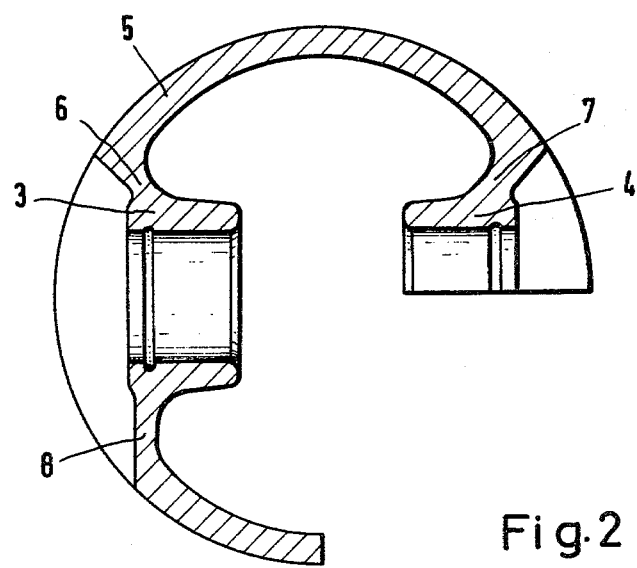

The piston comprises a piston head 1, which includes a ring-carrying portion 2 and is provided with piston pin bosses 3, (FIG. 2). A non-symmetrical piston skirt 5 extends from the piston head. To ensure an expansion control action and a stability which prevents a permanent deformation of the skirt 5, one portion thereof, disposed on the pressure side, is connected to the piston pin bosses 3, 4 by supporting ribs 6, 7 (FIG. 2), which extend at an angle of 45° to the piston pin axis. The opposite skirt portion, disposed on the backpressure side, is supported against the piston pin bosses 3, 4 by supporting ribs 8 (FIG. 2), which extend at an angle of 90° to the piston pin axis. At the open end of the skirt, disposed below the piston pin bosses 3, 4, the two skirt portions are joined to form a skirt in the shape of a closed ring.

Adjacent to the top end of the skirt, a closed ring 11 of sheet metal is embedded in the skirt casting below the lowermost ring groove 10. A transverse slot 12 prevents a heat flow from the piston head 1 to the skirt so that the temperature is decreased and with it the expansion.

Figure 6:
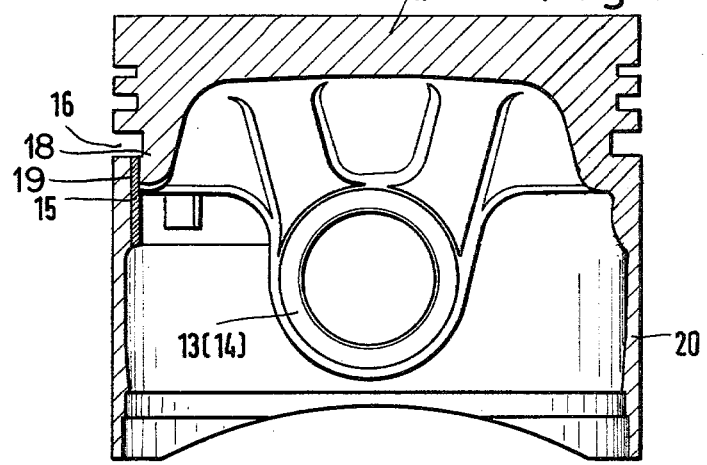
Figure 3:
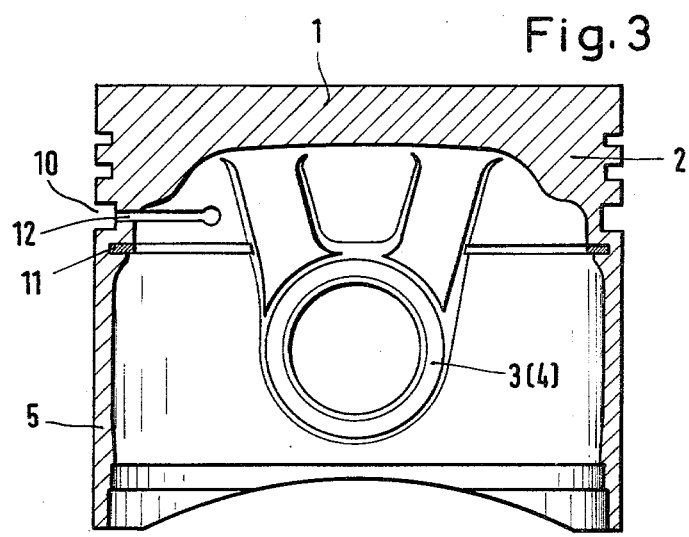
Figure 4:
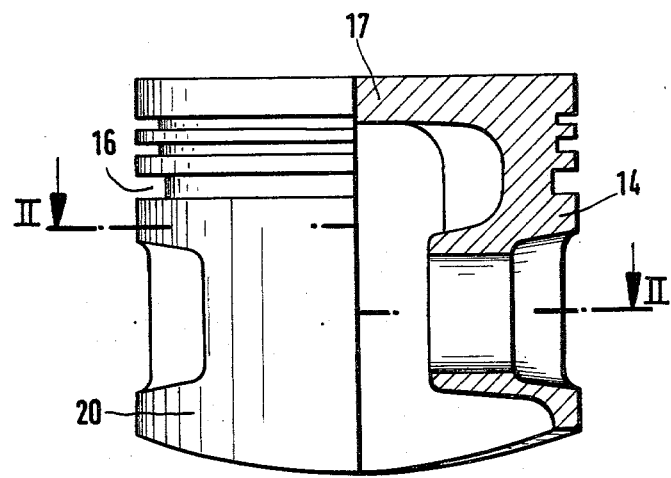
Figure 5:
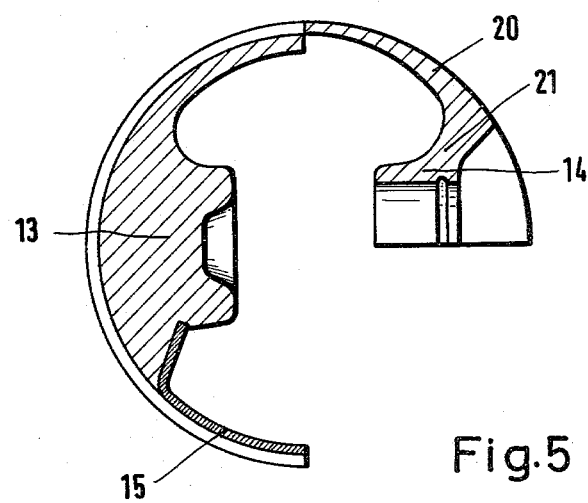

For use in high-duty internal-combustion engines, the light-alloy piston can be designed so that a segment-shaped steel member 15 (FIGS. 5,6) is anchored in the piston pin bosses 13, 14 and is embedded in the casting only on the pressure or backpressure side or on the pressure and backpressure sides to provide for the required expansion control. The steel number 15 is so embedded in the casting that the steel member 15 is cut at its top edge as the ring groove 16 is machined. A gap 19 is provided between the steel member 15 and the integrally cast bead 18 provided on the inside surface of the piston head 17. That gap 19 is closed when the piston has been heated so that the top edge of the skirt 20 then bears on the bead 18. With the assistance of the skirt portions supported by ribs 21 (FIG. 5) that extend at angles of 45° and 90°, respectively, to the piston pin axis, the expansion control action can be adapted to the requirements imposed by the engine.

We claim:

1. A cast light-alloy piston comprising a skirt, piston pin bosses, said skirt being recessed adjacent to said bosses, said skirt being non-symmetrical on both sides of the plane of the piston pin, said skirt
   (a) being connected on one side to said piston pin bosses by first supporting ribs which extend at an angle of 30 to 60 degrees to the piston pin axis,
   (b) being connected on the other side to the piston pin bosses by second supporting ribs which extend at an angle of 90 degrees to the piston pin axis.

2. A piston according to claim 1 wherein one side of said skirt is connected to the piston pin bosses by first supporting ribs extending at an angle of 45 degrees to the piston pin axis.

3. A piston according to claim 1 wherein said second supporting ribs extend 65 to 75 percent of the piston diameter.

4. A piston according to claim 1 wherein at least one side of said skirt is separated on 80 to 90 degrees of the periphery from the head of said piston by a transverse slot, said slot being disposed in the lowermost ring groove of said piston.

5. A piston according to claim 1 wherein a segment-shaped expansion control member of steel is disposed adjacent to the top edge of said skirt on the inside peripheral surface of at least one load-carrying skirt portion and is locked in said piston pin bosses.

6. A piston according to claim 5 wherein said segment-shaped expansion control member is supported by a bead which extends as an extension from the inside surface of the head of said piston and between said piston pin bosses.

7. A piston according to claim 5 wherein said control member is exposed within said lowermost ring groove throughout substantially its entire periphery.

* * * * *